United States Patent [19]

Parks et al.

[11] Patent Number: 5,600,801

[45] Date of Patent: Feb. 4, 1997

[54] MULTIPLE FUNCTION INTERFACE DEVICE FOR OPTION CARD

[75] Inventors: Terry J. Parks, Round Rock; Craig S. Jones, Austin, both of Tex.

[73] Assignee: Dell USA, L.P., Austin, Tex.

[21] Appl. No.: 92,044

[22] Filed: Jul. 15, 1993

[51] Int. Cl.⁶ ........................................................ G06F 6/00
[52] U.S. Cl. ............................................................ 395/282
[58] Field of Search ............................... 380/20, 25, 491;
395/425, 800, 163, 275; 370/85.8

[56] References Cited

U.S. PATENT DOCUMENTS

| | | | |
|---|---|---|---|
| 5,012,514 | 4/1991 | Renton | 380/4 |
| 5,063,596 | 11/1991 | Dyke | 380/49 |
| 5,247,633 | 9/1993 | Nissimov et al. | 395/404 |
| 5,287,460 | 2/1994 | Olsen et al. | 395/883 |
| 5,291,585 | 3/1994 | Sato et al. | 395/500 |
| 5,327,549 | 7/1994 | Nissimov et al. | 395/439 |
| 5,367,571 | 11/1994 | Bowen et al. | 380/20 |
| 5,388,267 | 2/1995 | Chan et al. | 395/700 |
| 5,465,357 | 11/1995 | Bealkowski et al. | 395/700 |

OTHER PUBLICATIONS

Grant Buckler, "Phoenixbids of Intel 82350DT Eisa Chip Set Available" May 9, 1991, Newsbytes, Phoenix Technologies Inc. Product Announcement.

Jerry Jex, "Flash Memory Bios for PC and Notebook Computers", Communications, Computers and Signal Processing, Jun. 1991, IEEE/IEE Pubs on Disc.

Primary Examiner—Gail O. Hayes
Assistant Examiner—Felicia Ives
Attorney, Agent, or Firm—Haynes and Boone, L.L.P.

[57] ABSTRACT

A device for interfacing an expansion bus with an option card and an associated method for initializing a computer system having the option card installed on the expansion bus thereof. The interface device includes a dual ported RAM having a first port coupled to the expansion bus and a second port coupled to the option card, a processor coupled to the second port of the dual ported RAM and a non-volatile memory coupled to the processor and to the second port of the dual ported RAM. At power up, the processor transfers an expansion BIOS and pattern stored in the non-volatile memory to first and second portions, respectively, of the memory space of the dual ported RAM. The computer system scans the second portion of the dual ported RAM for the pattern, executes a first initialization sequence contained in the expansion BIOS upon detecting the pattern and then executes a second initialization sequence contained in a BIOS of the computer system. Data acquired during the execution of the initialization sequence is stored in a third portion of the memory space. Updates to the expansion BIOS are transferred to a fourth portion of the memory space where the processor transfers the updates to the non-volatile memory. The processor also controls bi-directional exchanges of data and control signals between the expansion bus and the option card via the fourth portion of the memory space.

32 Claims, 2 Drawing Sheets

MULTIPLE FUNCTION INTERFACE DEVICE FOR OPTION CARD

BACKGROUND OF THE INVENTION

1. Field of the Invention

The invention relates to an option card installable in a computer system and, more particularly, to a multiple function interface device for coupling the option card with an expansion bus of the computer system.

2. Description of Related Art

In its most basic configuration, a personal computer (or "PC") is comprised of a main logic board which contains a central processing unit (or "CPU") and a memory subsystem coupled together by an expansion bus. The basic configuration of the PC can be augmented significantly and numerous capabilities added to the machine by the addition of various expansion modules or other I/O devices, commonly referred to as option cards, to the PC. To add such a device, the option card is inserted into a slot on the main logic board. Once inserted, the option card is coupled with the expansion bus of the PC.

The basic input output system (or "BIOS") of the disk operating system (or "DOS") for the typical PC is that portion of the operating system which provides an interface between the DOS kernel and the underlying hardware. More specifically, the DOS kernel passes commands from application software to the BIOS for translation into hardware-specific requests. During start-up of the PC, the BIOS is also responsible for initializing I/O devices installed on the expansion bus. However, certain option cards, for example, a disk array controller card, are required to operate during initialization. Accordingly, for the BIOS to implement the functions of option cards which are required to operate at initialization, such option cards require an expansion BIOS to augment or replace a portion of the main BIOS. While it is possible for the expansion BIOS to be placed on the computer system, as the number of option cards which may be installed in a PC is nearly limitless, the expansion BIOS is typically provided on the option card itself. For this reason, prior option cards have contained a discrete read only memory, hereafter referred to as an "option ROM", which contains the expansion BIOS for the option card. During the power-on, self-test (or "POST") process, the main BIOS will search the address space of the option card for the presence of option ROMs and, upon detection of such, will execute the expansion BIOS contained therein.

In addition to the information contained in the option ROM, the expansion BIOS will sometimes require "scratchpad" random access memory (or "RAM") to implement its functions or to provide variable information to the PC. For example, if the installed option card is a disk array controller card, disk drive geometry information will vary, depending on the particular drives connected to the disk controller. Accordingly, option cards having an expansion BIOS requiring a limited amount of volatile memory further include a small RAM on the card for this particular purpose.

Finally, option cards also require a command and data interface with the expansion bus, the size of which tends to vary depending on the number of exchanges between the expansion bus and the option card to be transferred through the interface. Accordingly, option cards are typically provided with a small dual ported register file. The CPU can then place commands into the register file for execution by a local processor installed on the option card. After completing execution of the commands, the local processor can place status or results into the dual ported register file for access by the CPU.

Heretofore, option cards have been provided with separate structures for each of the option ROM, scratchpad RAM and command/data interface. It can be readily seen that it would be desirable to provide an option card which incorporates these features into a single structure. Accordingly, it is an object of the present invention to provide an option card having an interface with the expansion bus which is structured to perform multiple functions, including those associated with the expansion BIOS.

SUMMARY OF THE INVENTION

In one embodiment, the present invention is of a device for interfacing an expansion bus of a computer system with an option card installed on the expansion bus. The interface device includes a dual ported RAM having a first port coupled to the expansion bus and a second port coupled to the option card and a circuit for loading the dual ported RAM with an expansion BIOS. The computer system scans the dual ported RAM for the expansion BIOS and, upon detecting the expansion BIOS, executes an initialization sequence contained in the expansion BIOS. The computer system then executes an initialization sequence contained in a BIOS coupled with the expansion bus.

In various aspects thereof, the interface device further includes a processor coupled to the second port of the dual ported RAM for controlling bi-directional exchanges of data and control signals between the expansion bus and the option card via the dual ported RAM, a non-volatile memory coupled to the processor for transferring the expansion BIOS from the non-volatile memory to the dual ported RAM and/or a second circuit for loading the dual ported RAM with a preselected pattern, the detection of which indicates the presence of the expansion BIOS. In a further aspect thereof, the expansion BIOS and pattern are loaded into first and second portions, respectively, of the dual ported RAM. In this aspect, the computer system scans the second portion of the dual ported RAM for the pattern and executes the initialization sequence contained in the expansion BIOS stored in the first portion of the dual ported RAM upon detection of the pattern. In still further aspects thereof, bi-directional exchanges of data and control signals are performed via a third portion of the dual ported RAM, data acquired during execution of the initialization sequence contained in the expansion BIOS is stored in a fourth portion of the dual ported RAM and updates of the expansion BIOS are transferred to the non-volatile memory via the third portion of the dual ported RAM.

In another embodiment, the present invention is of a device for interfacing an expansion bus of a computer system with an option card installed on the expansion bus. The interface device includes a dual ported RAM having a first port coupled to the expansion bus, a second port coupled to the option card and memory space configurable into first, second, third and fourth portions. Coupled to the second port of the dual ported RAM is a processor and a non-volatile memory. An expansion BIOS containing an initialization sequence for the option card and a preselected pattern, both of which are originally stored in the non-volatile memory, is transferred to the first and second portions of the dual ported RAM, respectively. The computer system scans the second portion of the dual ported RAM for the preselected pattern and executes the initialization sequence contained in the expansion BIOS stored in the first portion of the dual ported RAM upon detection of the pattern. Thereafter, the computer system executes an initialization sequence contained in the BIOS. Data acquired during the execution of the initialization sequence contained in the expansion BIOS is stored in the fourth portion of the dual ported RAM and updates to the expansion BIOS are placed in the third portion of the dual ported RAM of the computer system where the processor transfers the updates to the non-volatile memory. The processor further controls the exchange of data and control signals between the expansion bus and the option card, again via the third portion of the dual ported RAM.

In yet another embodiment, the present invention is of a method for initializing a computer system having an expansion bus and an option card inserted in the expansion bus. Upon powering up the computer system, an expansion BIOS stored on the option card is loaded into a dual ported RAM. The computer system searches for the expansion BIOS and executes a first initialization sequence contained in the expansion BIOS upon the detection thereof. After execution of the first initialization sequence, or if the expansion BIOS is not located, the computer system then executes a second initialization sequence contained in a BIOS coupled to the expansion bus. To locate the expansion BIOS, the computer system searches a predefined address space for a preselected pattern. After loading is complete, the expansion BIOS may be updated by writing to a non-volatile memory coupled with the dual ported register file where the expansion BIOS was originally stored. In one aspect, execution of the first initialization sequence further includes the steps of acquiring data during the execution of the first initialization sequence and storing the acquired data.

In still another embodiment, the present invention is of a method of operating a computer system having an expansion bus, a BIOS coupled to the expansion bus and at least one option card inserted in the expansion bus. An expansion BIOS stored on the option card is loaded into a first portion of a dual ported RAM at power up. The computer system searches for the expansion BIOS and executes a first initialization sequence contained in the expansion BIOS upon the detection thereof. After execution of the first initialization sequence, or if the expansion BIOS is not detected, a second initialization sequence contained in the BIOS is executed. After completing the second initialization sequence, the expansion bus exchanges data and command signals with the option card via a second portion of the dual ported RAM.

In various aspects thereof, the expansion BIOS is stored in a non-volatile memory coupled with the dual ported RAM. During the loading process, a preselected pattern is loaded into a third portion of the dual ported RAM and a pointer to the expansion BIOS is loaded into a fourth portion of the dual ported RAM. The search for the expansion BIOS is then conducted by searching the third portion of the dual ported RAM for the preselected pattern. Data acquired during the first initialization sequence is then stored in a fifth portion of the dual ported RAM and updates to the expansion BIOS are written to the non-volatile memory via the second portion of the dual ported RAM.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1:
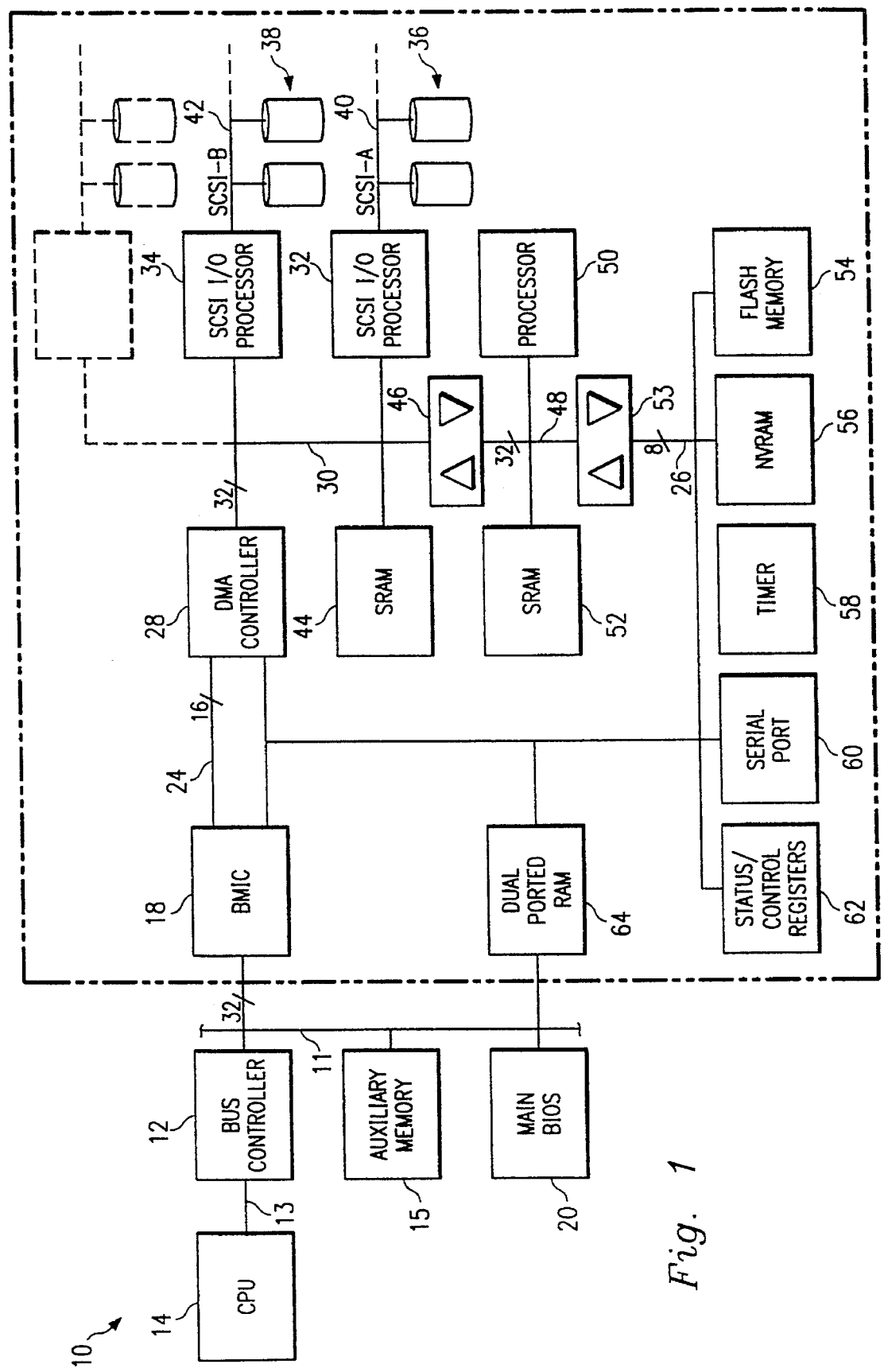
FIG. 1 is a block diagram of a computer system having an expansion bus in which an option card provided with a multiple function interface device constructed in accordance with the teachings of the present invention, is installed.

Referring first to FIG. 1, a computer system 10 having an option card 16 provided with a multiple function interface device, constructed in accordance with the teachings of the present invention, installed therein will now be described in greater detail. More specifically, the computer system 10 includes an expansion bus 11 for bi-directional exchanges of address, data and control signals between various components of the computer system 10 such as a central processing unit (or "CPU") 14, main memory (which is hereby defined as the total addressable space, other than auxiliary memory, for the computer system 10), and various peripheral devices, including an auxiliary memory 15, associated with the expansion bus 11. Preferably, the expansion bus 11 should be a 32-bit extended industry standard architecture (or "EISA") type expansion bus having a transfer rate on the order of 33 MBytes per second and the CPU 14 should be coupled to the expansion bus 11 by bus controller 12 which controls the exchange of signals between host bus 13, to which the CPU 14 is electrically connected thereto, and the expansion bus 11.

Also installed on the expansion bus 11 is an option card 16 having a multiple function interface device incorporated therein. It is contemplated that innumerable types of option cards 16 may be installed in the expansion bus 11. Accordingly, it should be clearly understood that the disk array controller card illustrated herein as option card 16 is by way of example only and should not be construed as a limitation on the scope of the present invention. As to be more fully described below, the multiple function interface device includes a dual ported RAM 64 which is utilized in the exchange of data and control signals between the expansion bus 11 and the option card 16. However, as the particular option card 16 illustrated herein is a disk array controller card, it is contemplated that this particular option card will require an additional interface between the expansion bus 11 and the option card 16 to handle the large number of exchanges which occur between the two. Depending on the volume of exchanges between the expansion bus 11 and the option card 16, it is contemplated that, for certain option cards 16, the dual ported RAM portion 64 of the multiple function interface device will have sufficient capacity to handle all transfers of data control signals between the expansion bus 11 and the option card 16.

Accordingly, residing on the expansion bus 11 and providing first and second interfaces between the illustrated disk array controller card and the expansion bus 11 are the dual ported RAM 64 portion of the multiple function interface device constructed in accordance with the teachings of the present invention and to be more fully described below and a bus master interface chip (or "BMIC") 18, for example, an 82355 BMIC manufactured by Intel Corporation of Santa Clara, Calif. The BMIC 18 is a 32-bit bus master and I/O slave clocked at 16.7 MHz for the transfer of data and addresses between the expansion bus 11 and a 16-bit DMA bus 24 of the illustrated disk array controller card. The multiple function interface device, on the other hand, contains the expansion BIOS required to initialize the option card 16, provides scratchpad random access memory (or "RAM") to store data acquired by option card 16 during the initialization sequence, and data registers where command and/or data signals may be exchanged between the expansion bus 11 and the option card 16. Thus, upon boot, and in a manner more fully described below, the multiple function interface device provides the CPU 14 and the main BIOS 20 with the expansion BIOS, i.e. that data needed by the main BIOS 20 to initialize the option card 16. If data is acquired during the initialization of the option card 16 or if the expansion BIOS of the option card 16 is varied during operation of the option card 16, the multiple function interface device further provides scratchpad RAM in which any such acquired data are stored. Also, the multiple function interface device may be used to transfer data and/or control signals between the expansion bus 11 and the option card 16 or, more specifically, in the example illustrated herein with an 8-bit extension bus 26 of the disk array controller card, during operation of the option card 16.

A DMA controller 28 couples the 16-bit DMA bus 24 and a 32-bit main system bus 30 for the disk array controller card 16. The DMA controller includes first-in first-out (or "FIFO") type registers to buffer data being transferred between the 16-bit DMA bus 24 and the 32-bit main system bus 30 and yet another FIFO to provide a portion of each address in memory from which data is to be transferred. By this use of data and address FIFOs, the DMA controller 28 provides for very efficient transfers of data between the DMA bus 24 and the main system bus 30 with minimal processor overhead.

Also residing on the main system bus 30 for the disk array controller card 16 are first and second small computer system interface (or "SCSI") channels. Each SCSI channel includes a SCSI input/output (or "I/O") processor 32, 34 which provide respective interfaces between the main system bus 30 and SCSI bus 40, 42. Each SCSI I/O processor, which, for example, may be a type 53C710 processor manufactured by NCR clocked at 33.3 MHz, controls the bi-directional transfer of data to or from a corresponding auxiliary memory storage system 36, 38 which respectively reside on the SCSI bus 40, 42. Data stored in the auxiliary memory storage system 36, 38, which, for example, may include one or more SCSI disk type data storage devices, may be transferred by the SCSI I/O processor 32, 34 to a static random access memory (or "SRAM") 44 which acts as a shared main memory for the SCSI I/O processors 32, 34. From SRAM 44, data transfers to the expansion bus 11 are controlled by the BMIC 18. The SCSI I/O processors 32, 34 may also fetch data or instructions from the SRAM 44 for transfer to the auxiliary memory storage systems 36, 38. It should be noted, however, that while FIG. 1 illustrates a pair of SCSI channels residing on the main system bus 30, it is specifically contemplated that any number of additional SCSI channels, one of which is illustrated in phantom in FIG. 1, may reside on the main system bus 30 for the option card 16.

Bridge 46 provides an interface between the main system bus 30 for the option card 16 and a 32-bit local bus 48. The local bus 48 is controlled by processor 50 which, for example, may be a 80960CA processor manufactured by Intel Corporation and clocked at 33.3 MHz. Together with a 0.5 MB SRAM 52 which contains code and data required for communication and control purposes, the processor 50 controls communication with the expansion bus 11 and controls the hardware residing on the extension bus 26 of the illustrated disk array controller card.

Bridge 53 provides an interface between the local bus 48 and the 8-bit extension bus 26 which permits the processor 50 to control the extension bus 26 as well. Residing on the extension bus 26 are a 256 KB FLASH memory 54, an 8 KB non-volatile random access memory (or "NVRAM") 56, timer 58, serial port 60 and status/control registers 62.

Continuing to refer to FIG. 1, the multiple function interface device will now be described in greater detail. As previously stated, the multiple function interface device includes the dual ported RAM 64 having a first port coupled to the expansion bus 11, a second port coupled to the option card 16, in the present example, by coupling the second port to the 8-bit extension bus 26, and a memory space configurable into multiple portions thereof. The multiple function interface device further includes the processor 50 and the FLASH memory 54, both of which are coupled to the second port of the dual ported RAM 64 via the extension bus 26. As will be more fully described below in connection with FIGS. 2–3, at various time intervals, the dual ported RAM 64, with the assistance of the processor 50 and the FLASH memory 54, may function as an option ROM, a scratchpad RAM for the option card 16 and/or a data/control signal interface between the expansion bus 11 and the option card 16. Finally, it is noted that while the multiple function interface device includes both the processor 50 and the FLASH memory 54 of the illustrated disk array controller, it is contemplated that, in an alternate embodiment of the invention, the multiple function interface device may utilize a processor and/or FLASH memory device specifically dedicated thereto, for interfacing the expansion bus 11 and the option card 16.

Figure 2:
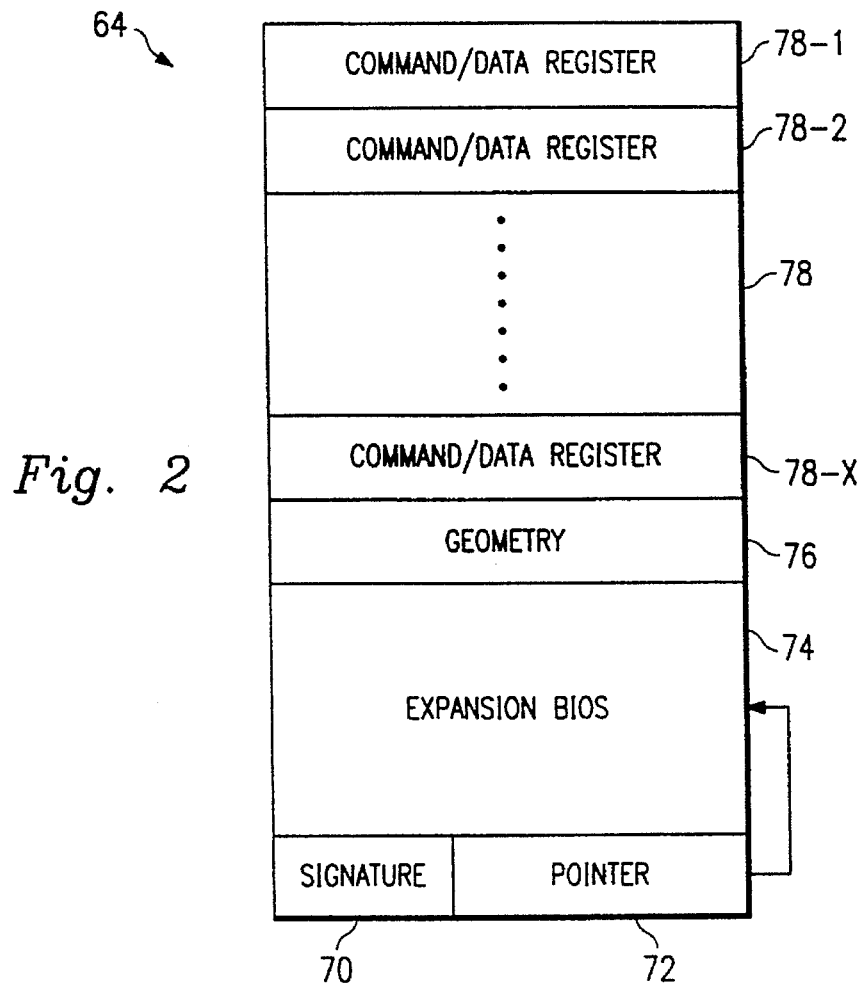
FIG. 2 is an expanded block diagram of a dual ported RAM portion of the multiple function interface device of FIG. 1.
Figure 3:
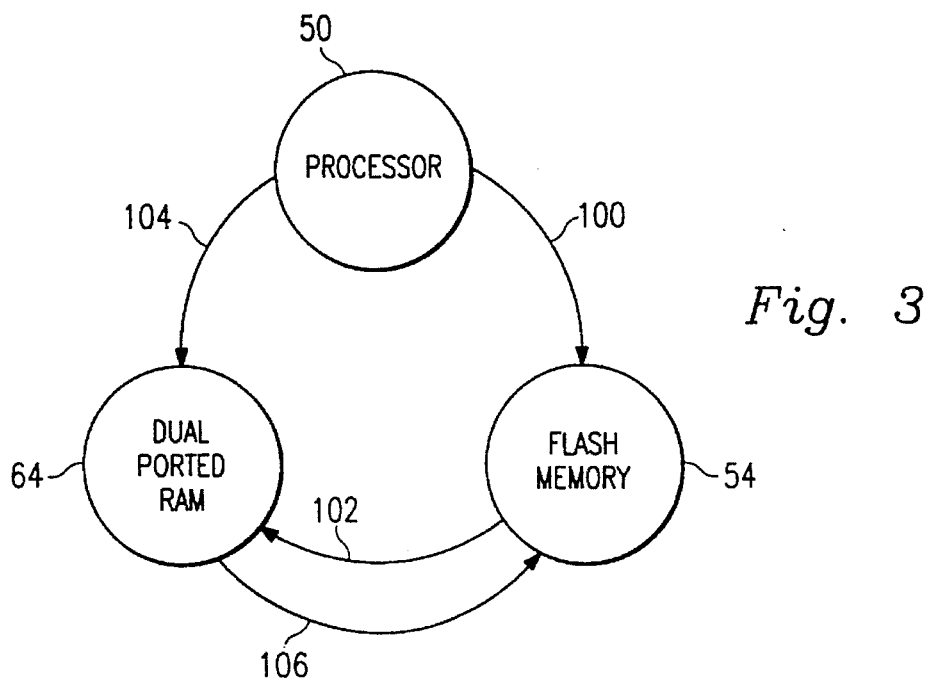
FIG. 3 is a state diagram illustrating the operation of the multiple function interface device of FIGS. 1 and 2.

Referring next, in combination, to FIGS. 2 and 3, the operation of the multiple function interface device and the various configurations of the dual ported RAM 64 at various times during the operation thereof, will now be described in greater detail. Initially, a signature, pointer and expansion BIOS are stored in the FLASH memory 54. During the process of powering up the computer system 10 having the option card 16 installed in the expansion bus 11 thereof, a reset signal is received by the multiple function interface device. When the processor 50 detects the reset signal, the processor 50 instructs the FLASH memory 54 at step 100 to transfer the signature, pointer and expansion BIOS into first, second and third portions 70, 72 and 74, respectively, of the dual ported RAM 64 at step 102.

After the signature, pointer and expansion BIOS have been stored in the dual ported RAM 64, the main BIOS 20 of the computer system 10, will begin searching for the presence of option cards and, more specifically, expansion BIOS, installed on the expansion bus 11. If, however, the main BIOS 20 attempts to search the dual ported RAM 64 before the expansion BIOS has been installed therein, a "not ready" signal which causes the main BIOS 20 to wait before again attempting to search the dual ported RAM 64 will be issued.

When the dual ported RAM is ready, the main BIOS 20 will search a predefined address range within the dual ported RAM 64 for the signature. For example, the main BIOS 20 may search address range C8000h-DFFFFh in 2K increments for the signature. If the main BIOS 20 detects the signature, typically two words of data set to a specified value stored in the first portion 70 of the dual ported RAM, it is determined that the option card 16 includes an expansion BIOS stored in the dual ported RAM 64. After determining the presence of an expansion BIOS for the option card 16, a pointer stored in the second portion 72 of the dual ported RAM 64, typically, the data word immediately after the signature, directs the main BIOS 20 to a location within the third portion 74 of the dual ported RAM 64 where an initialization sequence contained within the expansion BIOS is located. The main BIOS 20 then executes the set of instructions forming the initialization sequence contained in the expansion BIOS, thereby initializing the option card 16.

During execution of the initialization sequence contained in the expansion BIOS, or other use of the expansion BIOS, the option card 16 may require a certain amount of memory to store data acquired during such usage. For example, during the execution of the initialization sequence for a disk array controller card, the expansion BIOS will determine the geometry, i.e., the number of heads, sectors and cylinders, for each of the various disk drives controlled by the disk array controller and store this information in a fourth portion 76 of the dual ported RAM 64 where it may be accessed by the CPU 14 as needed via the expansion bus 11. After the initialization sequence contained in the expansion BIOS is completed, the main BIOS 20 will then execute a second initialization sequence contained therein to complete initialization of the computer system 10.

After initialization is complete, the computer system 10 commences normal operation. During normal operation of the computer system 10, the multiple function interface device may perform updates of the expansion BIOS or transfers of data and/or control signals between the expansion bus 11 and the option card 16. To update the expansion BIOS, the CPU 14 places the updated information into a selected command/data register 78-1 through 78-X of the fourth portion 78 of the dual ported RAM 64 at step 104. Once placed in a selected command/data register 78-1 through 78-X, at step 106, the processor 50 issues an instruction which initiates the writing of the update to the expansion BIOS to the FLASH memory 54. Similarly, to transfer data or control signals between the expansion bus 11 and the option card 16, for example, a command, the CPU 14 places the command into a selected command/data register 78-1 through 78-X. The processor 50 then issues an instruction to write the command to the option card 16, for example, to the SRAM 52 of the illustrated disk array controller card. The processor 50 may then place a reply, for example, a command result, into a selected command/data register 78-1 through 78-X, where the reply may be read by the CPU 14.

Thus, there has been described and illustrated herein, a device for interfacing an expansion bus of a computer system with an option card installed on the expansion bus. The disclosed interface device is configured to perform multiple functions, including initialization of the option card, storing data acquired during initialization, performing updates of the expansion BIOS and providing a data and command interface between the expansion bus and the option card. By providing such a multiple function interface device, considerable savings have been achieved by eliminating the separate and discrete structures disclosed in the prior art for performing the various functions now performed by the single multiple function interface device subject of the present invention.

The foregoing detailed description is to be clearly understood as being given by way of illustration and example only, the spirit and scope of the present invention being limited solely by the appended claims.

What is claimed is:

1. For a computer system having an expansion bus and a BIOS coupled with said expansion bus, said BIOS containing an initialization sequence for said computer system, a device for interfacing said expansion bus with an option card installed on said expansion bus, comprising:
   a dual ported RAM having a first port coupled to said expansion bus and a second port coupled to said option card; and
   a first circuit for loading said dual ported RAM with an expansion BIOS, said expansion BIOS thereafter containing an initialization sequence for said option card, wherein said computer system:
      scans said dual ported RAM for an indication that said expansion BIOS is stored in said dual ported RAM,
      if said expansion BIOS is stored in said dual ported RAM, executes said initialization sequence contained in said expansion BIOS, and
      thereafter executes said initialization sequence contained in said BIOS.

2. The device according to claim 1 further comprising a processor coupled to said second port of said dual ported RAM, said processor controlling bi-directional exchanges of data and control signals between said expansion bus and said option card via said dual ported RAM.

3. The device according to claim 2 further comprising a non-volatile memory, containing said expansion BIOS, coupled to said processor and to said second port of said dual ported RAM, said processor transferring said expansion BIOS from said non-volatile memory to said dual ported RAM.

4. The device according to claim 1 further comprising:
   a second circuit for loading said dual ported RAM with a preselected pattern;
   said computer system scanning said dual ported RAM for said preselected pattern and executing said initialization sequence contained in said expansion BIOS upon detection of said pattern.

5. The device according to claim 4 wherein said expansion BIOS is loaded into a first portion of said dual ported RAM and said pattern is loaded into a second portion of said dual ported RAM, said computer system scanning said second portion of said dual ported RAM for said preselected pattern and executing said initialization sequence contained in said expansion BIOS stored in said first portion of said dual ported RAM upon detection of said pattern stored in said second portion of said dual ported RAM.

6. The device according to claim 5 further comprising a processor coupled to said second port of said dual ported RAM, said processor controlling bi-directional exchanges of data and control signals between said expansion bus and said option card via a third portion of said dual ported RAM.

7. The device according to claim 6 further comprising a non-volatile memory coupled to said processor and to said second port of said dual ported RAM, said processor respectively transferring said expansion BIOS and said preselected pattern from said non-volatile memory to said first and second portions of said dual ported RAM.

8. The device according to claim 7 wherein said non-volatile memory is a FLASH memory.

9. The device according to claim 7 wherein said dual ported RAM further comprises a fourth portion for storing data acquired during execution of said initialization sequence contained in said expansion BIOS.

10. The device according to claim 9 wherein said option card is a disk controller card and wherein disk geometry is stored in said fourth portion of said dual ported RAM.

11. The device according to claim 9 further comprising a circuit for updating said expansion BIOS.

12. The device according to claim 11 wherein said computer system places updates to said expansion BIOS into said third portion of said dual ported RAM and said processor transfers said updates placed in said third portion of said dual ported RAM to said non-volatile memory.

13. For a computer system having an expansion bus and a BIOS coupled with said expansion bus, said BIOS containing an initialization sequence for said computer system, a device for interfacing said expansion bus with an option card installed on said expansion bus, comprising:

a dual ported RAM having a first port coupled to said expansion bus, a second port coupled to said option card and memory space configurable into first, second, third and fourth portions thereof:

a processor coupled to said second port of said dual ported RAM, said processor controlling bi-directional exchanges of data and control signals between said expansion bus and said option card via said third portion of said dual ported RAM;

a non-volatile memory coupled to said processor and to said second port of said dual ported RAM, said processor respectively transferring an expansion BIOS containing an initialization sequence for said option card and a preselected pattern from said non-volatile memory to said first and second portions of said dual ported RAM, said computer system placing updates to said expansion BIOS into said third portion of said dual ported RAM and said processor transferring said updates placed in said third portion of said dual ported RAM to said non-volatile memory, wherein said computer system:

scans said second portion of said dual ported RAM for said preselected pattern, executes said initialization sequence contained in said expansion BIOS stored in said first portion of said dual ported RAM upon detection of said pattern stored in said second portion of said dual ported RAM, and thereafter, executes said initialization sequence contained in said BIOS, wherein data acquired during execution of said initialization sequence contained in said expansion BIOS is stored in said fourth portion of said dual ported RAM.

14. The device according to claim 13 wherein said option card is a disk controller card and wherein disk geometry is stored in said fourth portion of said dual ported RAM.

15. The device according to claim 14 wherein said non-volatile memory is a FLASH memory.

16. A method of initializing a computer system having an expansion bus, a BIOS coupled with said expansion bus and at least one option card inserted in said expansion bus, comprising the steps of:

upon powering up said computer system, loading an expansion BIOS stored on an option card inserted into said expansion bus into a dual ported RAM having a first port coupled to said expansion bus and a second port coupled to said option card;

said computer system searching for said expansion BIOS and executing a first initialization sequence contained in said expansion BIOS stored in said dual ported RAM upon detecting said expansion BIOS.

17. The method according to claim 16 wherein the step of said computer system searching for said expansion BIOS, further comprises the steps of:

executing a second initialization sequence contained in said BIOS if said expansion BIOS is not detected; and after executing said first initialization sequence, said computer system executing said second initialization sequence contained in said BIOS.

18. The method according to claim 17, further comprising the steps of:

prior to loading said expansion BIOS in said dual ported RAM, storing said expansion BIOS in a non-volatile memory coupled with said dual ported RAM; and after loading said expansion BIOS in said dual ported RAM, updating said expansion BIOS by writing to said non-volatile memory.

19. The method according to claim 18 wherein the step of executing a first initialization sequence stored in said dual ported RAM, further comprises the steps of:

acquiring data during said execution of said first initialization sequence; and storing said acquired data in said dual ported RAM.

20. The method according to claim 16 wherein the step of said computer system searching for said expansion BIOS, further comprises the steps of:

searching a predefined address space for a preselected pattern; and detecting said expansion BIOS by locating said preselected pattern stored in said predefined address space.

21. The method according to claim 20 wherein the step of updating said expansion BIOS by writing to said non-volatile memory, further comprises the steps of:

storing information related to said updated expansion BIOS in said dual ported RAM; and transferring said information related to said updated expansion BIOS from said dual ported RAM to said non-volatile memory.

22. The method according to claim 21 further comprising the step of storing said acquired data in said non-volatile memory.

23. A method for operating a computer system having an expansion bus, a BIOS coupled to said expansion bus and at least one option card inserted in said expansion bus, comprising the steps of:

upon powering up said computer system, loading an expansion BIOS stored on an option card inserted into said expansion bus into a first portion of a dual ported RAM having a first port coupled to said expansion bus and a second port coupled to said option card;

said computer system searching for said expansion BIOS and executing a first initialization sequence contained in said expansion BIOS stored in said first portion of said dual ported RAM upon detecting said expansion BIOS.

24. The method according to claim 23 wherein the step of said computer system searching for said expansion BIOS, further comprises the steps of:

executing a second initialization sequence contained in said BIOS if said expansion BIOS is not detected;

after executing said first initialization sequence, said computer system executing said second initialization sequence contained in said BIOS; and after completing said first initialization sequence, said expansion bus exchanging data and command signals with said option card via a second portion of said dual ported RAM.

25. The method according to claim 24 wherein the step of said computer system searching for said expansion BIOS, further comprises the steps of:

searching a predefined address space of said dual ported RAM for a preselected pattern; and detecting said expansion BIOS by locating said preselected pattern stored in said predefined address space of said dual ported RAM.

26. The method according to claim 25 wherein the step of loading said expansion BIOS into a first portion of said dual ported RAM further comprises the step of loading said preselected pattern into a third portion of said dual ported RAM.

27. The method according to claim 26 wherein the step of searching said predefined address space for said preselected pattern further comprises the step of searching said third portion of said dual ported RAM for said preselected pattern.

28. The method according to claim 27 wherein the step of loading said expansion BIOS into said first portion of said dual ported RAM further comprises the step of loading a pointer to said expansion BIOS into a fourth portion of said dual ported RAM.

29. The method according to claim 28, further comprising the step of, prior to loading said expansion BIOS in said dual ported RAM, storing said expansion BIOS in a non-volatile memory coupled with said dual ported RAM.

30. The method according to claim 29 further comprising the steps of:

acquiring data during said execution of said first initialization sequence; and storing said acquired data in a fifth portion of said dual ported RAM.

31. The method according to claim 30 further comprising the step of updating said expansion BIOS by writing to said non-volatile memory.

32. The method according to claim 31 wherein the step of updating said expansion BIOS by writing to said non-volatile memory further comprises the steps of:

storing information related to said updated expansion BIOS in said second portion of said dual ported RAM; and transferring said information related to said updated expansion BIOS from said second portion of said dual ported RAM to said non-volatile memory.

* * * * *